(No Model.)
A. E. HALL.
HORSESHOE.
No. 292,302. Patented Jan. 22, 1884.
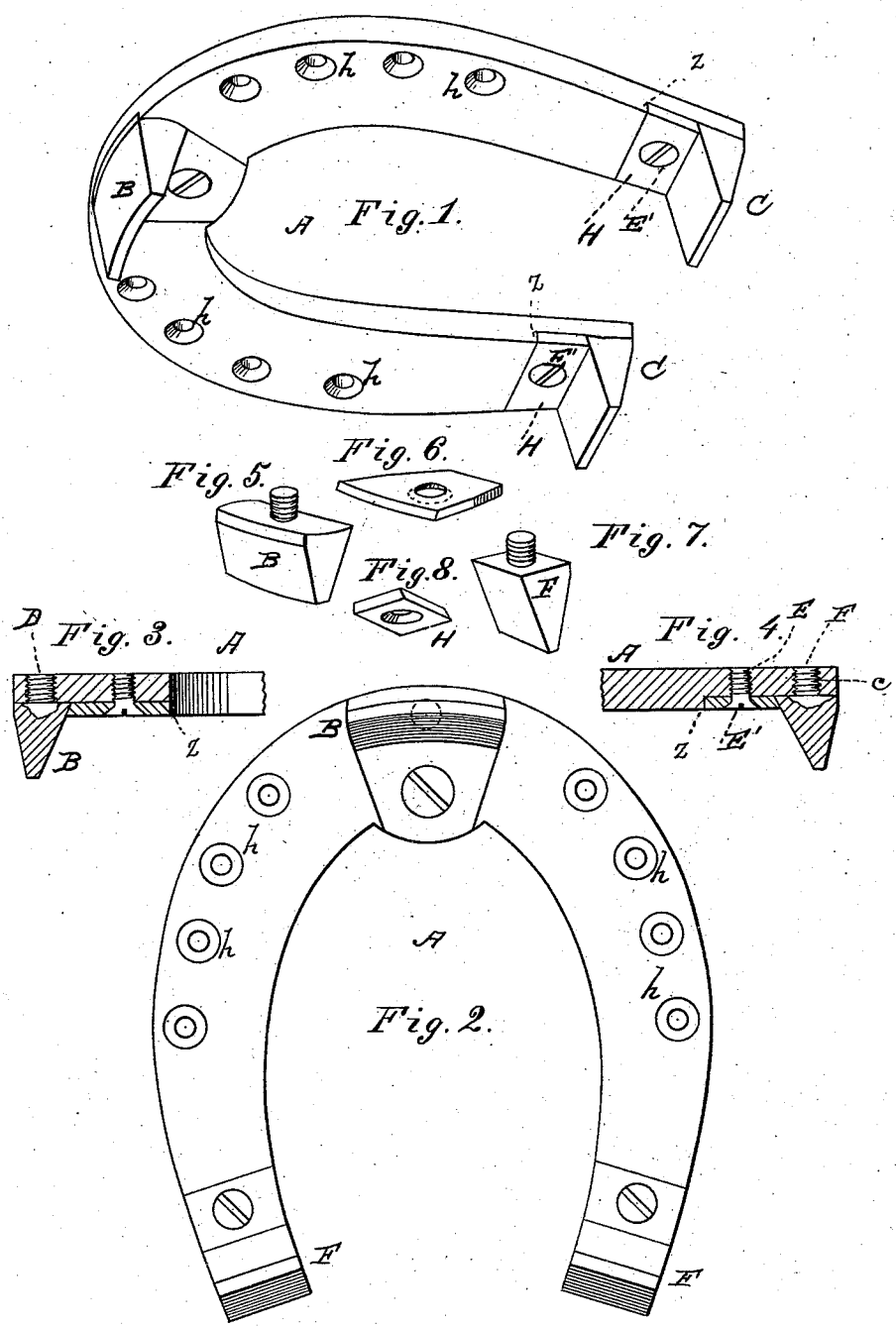
WITNESSES
Villette Anderson.
Emory H. Bates.
INVENTOR
Albert E. Hall,
by Anderson & Smith
his ATTORNEYS

UNITED STATES PATENT OFFICE.

ALBERT E. HALL, OF QUINCY, MINNESOTA.

HORSESHOE.

SPECIFICATION forming part of Letters Patent No. 292,302, dated January 22, 1884.

Application filed June 28, 1883. (No model.)

*To all whom it may concern:*

Be it known that I, ALBERT E. HALL, a citizen of the United States, residing at Quincy, in the county of Olmstead and State of Minnesota, have invented certain new and useful Improvements in Horseshoes; and I do hereby declare that the following is a full, clear, and exact description of the same, reference being had to the accompanying drawings, forming part of this specification, in which—

Figure 1 is a perspective view taken from the under side of the shoe. Fig. 2 is a bottom view. Figs. 3, 4, 5, 6, 7, and 8 are detail views.

This invention has relation to horseshoes; and it consists in the construction and novel arrangement of parts, as will be hereinafter fully described, and particularly pointed out in the appended claim.

Referring by letter to the accompanying drawings, A designates the body of the horseshoe, provided with a series of perforations, $h$, in each arm, having countersinks at their lower terminations for the reception of the heads of the screws by which the shoe is to be secured to the hoof, as shown.

B designates the toe-calk, which is secured to the under face of the shoe A by a screw, D, so that it may be removed for sharpening it or replacing it when worn out.

C and C' designate the heel-calks, the base portions of which are either conical or angular in form, and are provided with threaded stems F, which enter the threaded perforations $c$ near the rear ends of the arms of the shoe. The rear ends of the arms of the shoe are recessed in their under faces in front of the perforations $c$, and are perforated at E to receive the threaded stems of screws E', to secure in place locking-plates H, which hold the heel-calks from turning loose by accident while in use. The toe-calk is secured in place in a similar manner. The heel and toe calks are both removable, and may be removed and sharpened at the farm without going to the smith-shop.

The advantages of the removable calk are obvious. There is no necessity of heating the shoe or removing from the hoof, and any ordinary workman may file or grind it, as desired. The calks can be changed for different kinds of weather, so that the animal may be either rough or smooth shod, and the durability of the shoe may be greatly prolonged.

The employment of screws instead of nails, although either may be used, is a decided advantage, as some animals are so fractious as to resent the hammer employed to drive the nails, while they will not fret or worry while the screw is being driven in by the screw-driver.

Having thus fully described my invention, what I claim as new, and desire to secure by Letters Patent, is—

A horseshoe having its under face recessed at its end and toe portions, and provided at each portion with two threaded perforations, in combination with the calks having threaded studs to engage the outer perforation of each recessed portion, the perforated locking-plates adapted to fit, respectively, the interspaces of the recesses, one end engaging the shoulders $z$ of the shoe and the other the inner sides of the calks, and securing-screws, substantially as specified.

ALBERT E. HALL.

Witnesses:
J. W. SHORT,
A. Z. PUTNAM.